United States Patent [19]

Reynolds et al.

[11] Patent Number: 4,769,754

[45] Date of Patent: Sep. 6, 1988

[54] STABILIZED WELDING POWER SOURCE INCLUDING A SERIES-RESONANT CURRENT-REGULATED CONVERTER USING A TRANSFORMER HAVING AN AIR-GAPPED CORE

[75] Inventors: Jon O. Reynolds, Appleton; Robert L. Risberg, Brookfield, both of Wis.

[73] Assignee: Miller Electric Mfg., Co., Appleton, Wis.

[21] Appl. No.: 78,148

[22] Filed: Jul. 27, 1987

[51] Int. Cl.⁴ .................. H02M 7/523; H02M 3/315
[52] U.S. Cl. .................. 363/71; 219/130.21; 363/28; 363/79
[58] Field of Search .............. 363/17, 28, 36, 37, 363/71, 79, 96; 219/130.21, 130.32, 137 PS

[56] References Cited

U.S. PATENT DOCUMENTS

| | | | |
|---|---|---|---|
| 3,621,362 | 11/1971 | Schwarz | 331/117 |
| 3,659,184 | 4/1972 | Schwarz | 307/261 |
| 3,893,015 | 7/1975 | Weil | 307/6 |
| 3,953,779 | 4/1976 | Schwarz | 363/28 |
| 4,048,468 | 9/1977 | Maule | 219/135 |
| 4,117,303 | 9/1978 | Hedberg | 219/130.1 |
| 4,152,759 | 5/1979 | Hedberg | 363/160 |
| 4,200,830 | 4/1980 | Oughton et al. | 320/32 |
| 4,369,489 | 1/1983 | Pruitt | 363/28 |
| 4,382,171 | 5/1983 | Hedberg | 219/130.1 |
| 4,460,949 | 7/1984 | Steigerwald | 363/28 |
| 4,520,255 | 5/1985 | Bredenkamp et al. | 219/130.1 |
| 4,581,692 | 4/1986 | Nayberg et al. | 363/27 |
| 4,628,427 | 12/1986 | Marvakov et al. | 363/27 |

FOREIGN PATENT DOCUMENTS

| | | | |
|---|---|---|---|
| 3222621 | 12/1983 | Fed. Rep. of Germany | 363/28 |
| 2480647 | 10/1981 | France | 219/130.32 |
| 1591720 | 6/1981 | United Kingdom | 219/130.21 |
| 951634 | 8/1982 | U.S.S.R. | 363/79 |

OTHER PUBLICATIONS

Cronin, "2800 Watt Series Inverter DC Power Supply," Power Condit. Spec. Conf., 1971 Record, pp. 117-123, Pasadena, Calif., U.S.A. (19-20 Apr. 1971).
Schwarz et al., A 95% Efficient Voltage Regulating 500 Watt Full Bridge Parallel Inverter-Converter Module with an Internal Frequency of 20 kHz," PESC 1978 Record, pp. 331-343, Syracuse, N.Y., U.S.A., (13-15 Jun. 1978).

Primary Examiner—William H. Beha, Jr.
Attorney, Agent, or Firm—Sughrue, Mion, Zinn, Macpeak, and Seas

[57] ABSTRACT

A pulse arc welding power supply incorporating one or more series resonant converters (SRC) for converting D.C. power to A.C. power which is then rectified to supply welding current. Each series resonant converter includes a series resonant tank circuit consisting of a capacitor, an inductor and the primary winding of a transformer whose secondary winding supplies current to the welding arc. The undesirable secondary output capacitor of the prior art is eliminated, as all the capacitance in the series resonant circuit is located on the primary side of the transformer. Current sensors sense the ringing current in the resonant circuit and also the load current and produce respective feedback signals which are used to control the switching frequency of an SCR bridge in the tank circuit, thereby maintaining the welding current at a desired value. Inner and outer current regulating loops, including a ramp generator, compensate for non-linearity in the continuous conduction mode of the SRC by limiting the switching frequency of the SCRs. a fault-predicting circuit also further limits the switching frequency in the continuous current mode for additional protection.

9 Claims, 5 Drawing Sheets

FIG. 1 SRC WELDING POWER SOURCE

STABILIZED WELDING POWER SOURCE INCLUDING A SERIES-RESONANT CURRENT-REGULATED CONVERTER USING A TRANSFORMER HAVING AN AIR-GAPPED CORE

BACKGROUND OF THE INVENTION

1. Field of the Invention

This invention relates generally to the field of welding power supplies and, more particularly, to an improved welding power supply incorporating a series resonant converter which is capable of producing a range of constant current outputs for pulsed arc welding and which is stable in operation at all output values.

2. Description of the Prior Art

Power sources for arc welding can be designed on the "inverter" theory. Among the various topologies is the series resonant converter (SRC) operating at high conversion frequencies to save weight and size. However, it is well-known that, particularly when an SRC is asked to produce a range of constant current outputs, stable operation at all output values is difficult to achieve. Furthermore, prior art SRCs generally required at their output large capacitors which become part of the tank "loop" of the SRC. Such capacitors are undesirable from a welding power source point of view, especially for fast response power sources which are expected to provide a dynamic pulse output.

More specifically, in the prior SRC art, particularly as disclosed in U.S. Pat. No. 3,953,779—Schwarz, gapless cores (toroids) are used for the transformer, and there is required at the output a large capacitor (for example, capacitor $C_o$ in FIG. 1 of the Schwarz patent) with high ripple current capability but, preferably, with a moderate capacitance in $\mu F$'s. The high ripple current requirement comes from the carrier (resonant) frequency current of the SRC, the current induced by the dynamics of the load and the pulse frequencies when pulsed GMAW welding is performed. Excess ripple current due to these sources caused excess heating of the output capacitor which is generally chosen as an electrolytic type in the interest of cost. Welding applications must contend with these high ripple conditions and, thus, the Schwarz converter is not usable in welding applications for this reason and for the following additional reasons:

1. In welding machines, particularly for use in the United States, it is customary to provide dual-voltage primary connections for the welding power source in order to accommodate both 230 and 460 volt three-phase inputs which, hen rectified, produce d.c. voltages of 320 and 640 volts, respectively. A method of reconnection to accommodate the two input voltages is to provide two bridges, then to connect them in parallel when the lower primary voltage is to be used, and in series when the higher primary voltage is to be used. However, the two bridges must balance and share equally in providing the load current. If they do not equally share the load, a voltage unbalance will occur in the two electrolytic input capacitors. The unbalance cannot be corrected in an analog manner because the two converters are operated phase-displaced and cannot be operated at different gating frequencies. To correct unbalance with heavy passive bleeder resistors is prohibitively wasteful of energy and creates a heat problem, etc. When the bridges of the two SRCs do not balance, voltage builds up on one of the bridge inputs and diminishes on the other, a condition which can produce a catastrophic voltage level which results in capacitor failure.

2. D.C. offset on the tank capacitor causes instability when a loss of ring back occurs, and transformer saturation is likely to follow this loss of ring back. Furthermore, an asymmetry of the waveform occurs (similar to synchronous noise), and the system becomes unstable and must be stopped or reset.

3. The system will not feed high voltage loads, such as 55 to 60 volt arcs. Special (and costly) boost circuitry is necessary instantaneously to "change the transfer turns ratio" in order to feed momentary high-voltage loads.

4. A "foot" develops on the SRC's volt-ampere curve because of free wheeling of the energy in the transformer's leakage inductance. This current is not monitored or is unrecognized by the primary current control system.

5. Prior art SRCs often use capacitors in series with the transformer secondaries in order to guarantee ring backs, along with full-wave diode bridge rectifiers. These capacitors must handle full load current. Such a prior art circuit is costly in components and doubles the rectifier losses when compared with a two-diode center-tapped arrangement, without capacitors.

There are several reasons why this d.c. offset can occur, but one of the principal reasons involves the output capacitor mentioned above:

1. With a dynamic arc load, fast cutback can occur, that is, the gating frequency of the switching SCRs can change from very high, where the tank is operated in the cut-in mode, to much lower where the tank is operated in the discontinuous conduction mode, in a short time. As an example, while welding, a drop of molten metal can bridge the gap between the electrode and the workpiece, thereby causing a change in the apparent arc voltage from 30 volts to near zero volts in a fraction of a millisecond. The regulating system detects this condition and quickly reduces the gating frequencies. However, this quick change in a downward direction can leave an offset voltage (an unwanted d.c. level) on the tank capacitor. This d.c. level diminishes the next ring forward half cycle, thereby reducing or eliminating the next ring back. An instability occurs because, with a loss of a ringback, transformer saturation occurs in the extreme. Another problem is that the SCR and tank capacitor voltages can become excessive at offset. Tank capacitors fail if they are subjected to voltage peaks well beyond their rating. An equally bad problem is that the d.c. offset can cause perturbations in the normally smooth output of the welding power source, triggered by rapid and dynamic changes in the arc load (which changes are perfectly normal and must be handled).

2. The Schwarz inverter requires boost circuits in order to feed loads in excess of 40 or 45 volts. The boost circuit consists of means for electronically switching the transformer turns ratio, thereby requiring additional cost and complexity, and introducing a destabilizing transient to the power circuit when it is called upon to operate.

3. The analog signal to discrete time interval converter ("asdtic"—see, for example, U.S. Pat. No. 3,659,184) or controller regulated only primary current, as used in the Schwarz type of inverter. Current transformers alone measured the primary current. The current transformers did not read the free-wheeling current in the d.c. secondary, and thus, did not truly reflect the actual output.

4. When an output electrolytic capacitor is used as proposed by Schwarz, the peak tank current decreases when slewing towards high repetition rates and, then, increases rapidly at "cut-in". Cut-in is the point where the SRC goes from discontinuous single sine waves to a continuous conduction wave train. This is a traumatic point in the range of the controller and results in discontinuities in the smooth output characteristics desired while sweeping from low current to high current output and vice versa. Also, when the dynamic load slews back and forth across the cut-in point, it induces additional problems due to the momentary d.c. tank offsets which were previously mentioned above.

5. In dual primary voltage welding machines (i.e., 230/460 volts), it is advantageous to provide two complete "H" bridges, and, then, connect them in parallel for the lower primary voltage and in series for the higher primary voltage. In the high primary voltage case, the input is rectified to a d.c. bus which is divided into two buses by a series capacitor arrangement. Each half bus then feeds one "H" bridge. These two inverters run simultaneously, and their d.c. outputs are paralleled for additive current. If there is an discrepancy in the current "draw" between the two inverters, the capacitive input divider can become unbalanced, to a point where one may be seriously over-voltaged while the other is well below its voltage rating. Such a discrepancy in current draw can produce a regenerative effect wherein the unbalance "runs away".

There are other U.S. patents which may be considered as relevant prior art.

More specifically, U.S. Pat. No. 4,520,255 discloses a self-oscillating welding circuit employing transistors as switches to cause current to flow alternately in opposite directions to the primary winding of a welding transformer.

U.S. Pat. Nos. 4,152,759 and 4,382,171 disclose frequency converters of a series capacitor type and used to supply welding current.

U.S. Pat. No. 4,117,303 discloses a frequency converter welding apparatus which eliminates problems, caused by an output capacitor, by using a choke which is placed upstream of an output capacitor to support the welding arc during a short-circuit condition.

U.S. Pat. Nos. 4,369,489 and 4,581,692 disclose d.c. voltage converters including transformers which are provided with an air gap but, apparently, not for the purpose of eliminating an output capacitor for use in arc welding.

U.S. Pat. No. 3,893,015 discloses an inverter power supply including two-series converters, together with transformer means for transferring the power from the a.c. output voltage of one inverter to the d.c. input of the other inverter, thereby forcing the two inverters equally to share the load.

The following patents may be of additional background interest: U.S. Pat. Nos. 3,621,362; 4,048,468; 4,200,830; 4,460,949 and 4,628,427.

SUMMARY OF THE INVENTION

Therefore, the primary object of the invention is to provide an improved series resonant converter (SRC) circuit for use in an arc welding power supply or source.

Another object of the invention is to provide such an SRC welding power source which is stable in operation and which is capable of producing a range of constant current outputs in the form of smooth, low-ripple d.c. current.

A further object of the invention is to provide such an SRC welding power supply which eliminates the conventional output capacitor which is highly undesirable for arc welding loads.

Still another object of the invention is to provide such an SRC welding power supply including current sensors for reading both the primary current and also the free-wheeling current in the d.c. secondary in order totally and stably to regulate the true output current to supply true constant current welding loads.

An additional object is to eliminate the need for output capacitors and to provide a means for returning excess resonant energy from the resonant tank circuit of the SRC to the source.

Another object is to provide such an SRC welding power supply wherein the load current is divorced from the primary current by the use of an "inductive bypass" at the inverter transformers, thereby guaranteeing a ring back without the need for a raw capacitor on the output of the secondary rectifier, and also keeping the primary circuit resonant within defined and desirable limits (2-to-1, etc.) under all load conditions, open-circuit-voltage to short-circuit and between.

A further object is to provide such an SRC welding power supply including circuitry which causes the characteristic impedance to rise at light loads (decreasing current in the primary of the tank circuit) and which raises the open-circuit-voltage via a high Q situation, while still keeping the leading power factor and natural commutation required for an SRC (allows for turn-off while the anti-parallel diode is conducting, for "natural" commutation of the semiconductor switch).

Still another object is to provide such an SRC welding power supply in which the resonant frequency is decreased to permit longer turn-off times at light loads; i.e., the resonant frequency is low at light loads, and high (or natural) at heavy loads.

Still another object is to provide an SRC welding power supply in which two SRCs are interleaved (or staggered) so that the resulting current ripple is less in the output. That is, we have found that an integrating current regulator, as is commonly used in closed-loop current sources, will not operate properly with two or more interleaved inverters in cut-in mode unless there is a gain break employed. Thus, we provide a current transformer-based gain break (or stabilizing ramp) which operates in concert with the integrating current regulator to stabilize the system. Current feedback is taken from the tank and applied to the gain break stabilizing ramp for the purpose of compensating for the d.c. offset which may occur on the tank capacitors as a result of reference or load disturbances. (It is vitally necessary if the dv/dt inductors are saturable.) With linear dv/dt inductors, it is not always necessary, and we implement that by using current feedback to change the slope of the stabilizing ramp.

Another broad object of the invention is the elimination of a capacitor directly across the output of the secondary rectifier to complete the tank circuit of an SRC welding power supply.

Still another object is the introduction of an air gap in the power transformer of an SRC welding power supply to reduce the magnetizing inductance and to impose a controlled lower frequency limit on operation at no load, as well as to protect the transformer from saturation.

Still another object is to provide an SRC welding power supply with an adjustable (or "adaptive") $t_q$ timer used to protect and stabilize the tank circuit of the SRC over changing load and/or resonant frequency conditions, by using an adjustable $t_q$ timer which adapts to the tanks changing resonant frequency that occurs from no load to full load, in order to inhibit the SCR gating pulses until the SCRs are fully turned off.

A more specific object of the invention is to provide an SRC welding power supply in which the controllable SCR switches in the tank circuit are gated at a frequency determined by comparing the output current with a reference ramp during a continuous conduction mode (CCM) of the tank circuit, thereby stabilizing operation of the power supply in the CCM mode.

Another object is to provide an SRC welding power supply having a regulating or controlling circuit which has inherent gain reduction and which includes (1) a summing circuit for accumulating the absolute value of the tank capacitor + the input voltage + the tank current squared—the load voltage, and (2) a comparator to create a gating inhibit for the purpose of limiting the maximum current and, therefore, the maximum voltage that can occur in the tank, to produce a regulation and protection function.

DETAILED DESCRIPTION OF PREFERRED EMBODIMENTS

Figure 1:
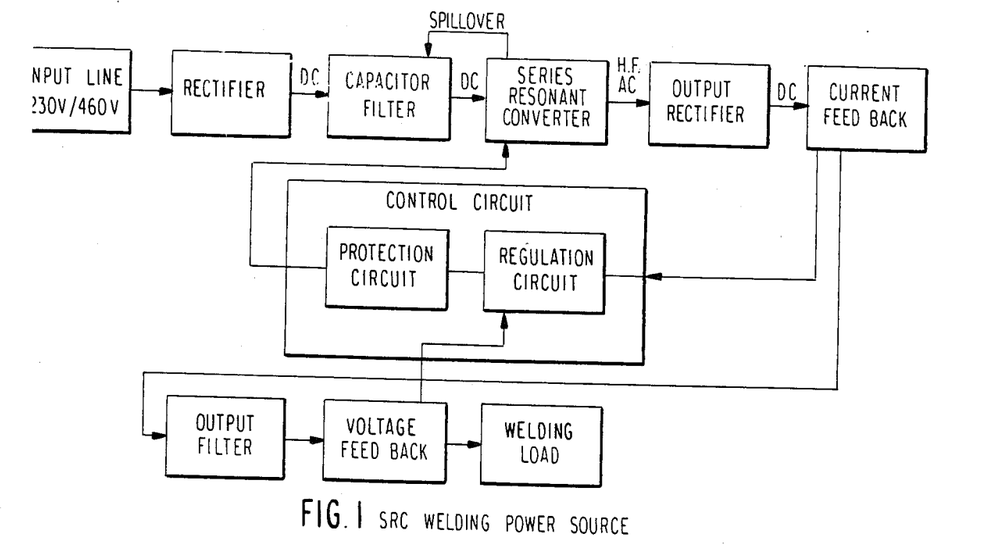
FIG. 1 is a block diagram of an SRC welding power supply embodying our invention.

FIG. 1 is a self-explanatory functional block diagram of a welding power source embodying our invention.

Figure 2:
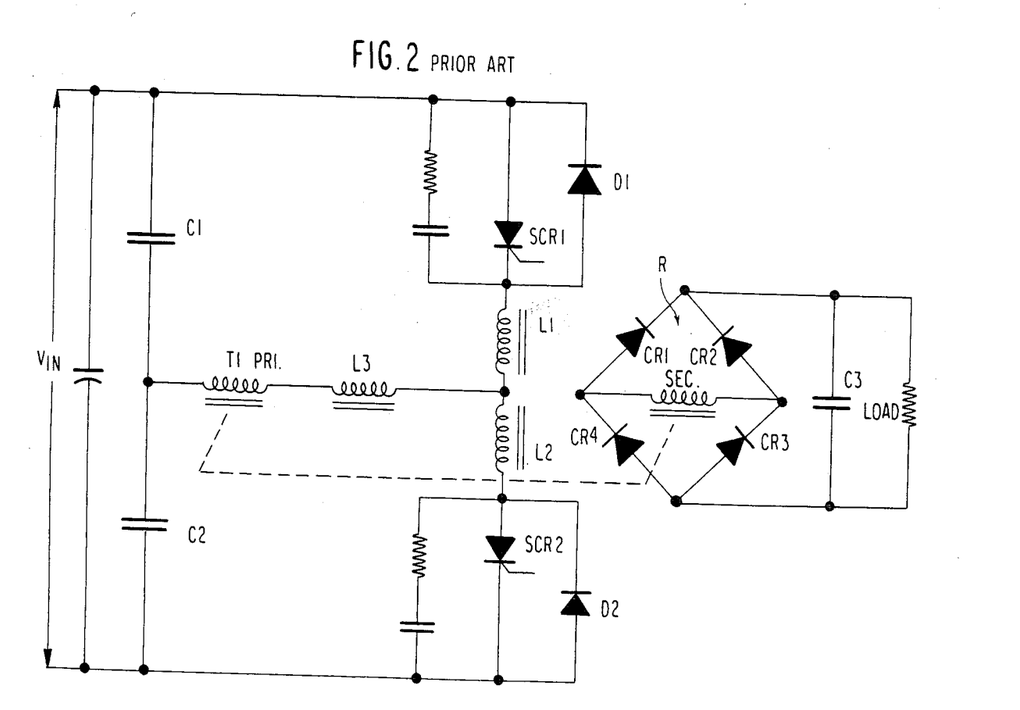
FIG. 2 is a schematic diagram of a conventional SRC power conversion circuit in a half-bridge configuration.

FIG. 2 represents the classical series resonant power conversion circuit in a half-bridge configuration. The circuit operates by alternately gating SCR1 and SCR2. When SRC1 is gated, voltage is applied to the resonant tank circuit consisting of L1, L3, transformer T1 primary, C1 and C2. If a load voltage does not exist, the output capacitor C3 loads the transformer and imposes zero volts on the primary winding. If load voltage does exist, the load voltage is reflected in the primary by the turns ratio. The peak current obtained is determined by the source voltage plus the tank capacitor voltage minus the transformer primary voltage multiplied by the reciprocal of the characteristic impedance of the resonant circuit.

A principal offending feature of this circuit is that the transformer turns ratio must be chosen so that the maximum primary voltage is not greater than one-half of the input voltage $V_{in}$. This condition must be met to insure that antiparallel diodes D1 and D2 conduct. Antiparallel diode conduction is required to insure that the SCR's are reverse-biased and allowed to turn OFF and to prevent transformer saturation that can occur in the extreme case. This requirement is undesirable because it imposes high current stress to the semiconductor switches and capacitors used in the primary circuit.

A second principal offending feature of this circuit is the requirement for a large capacitor C3 across the output of the secondary rectifier R. The presence of this capacitor is necessary to maintain a constant voltage on the transformer primary throughout a complete resonant cycle of the tank. This capacitor must be of high quality because of the very high ripple current to which it is exposed. The capacitor also acts to slow the response of the power source to dynamic load conditions.

Figures 3, 3C:
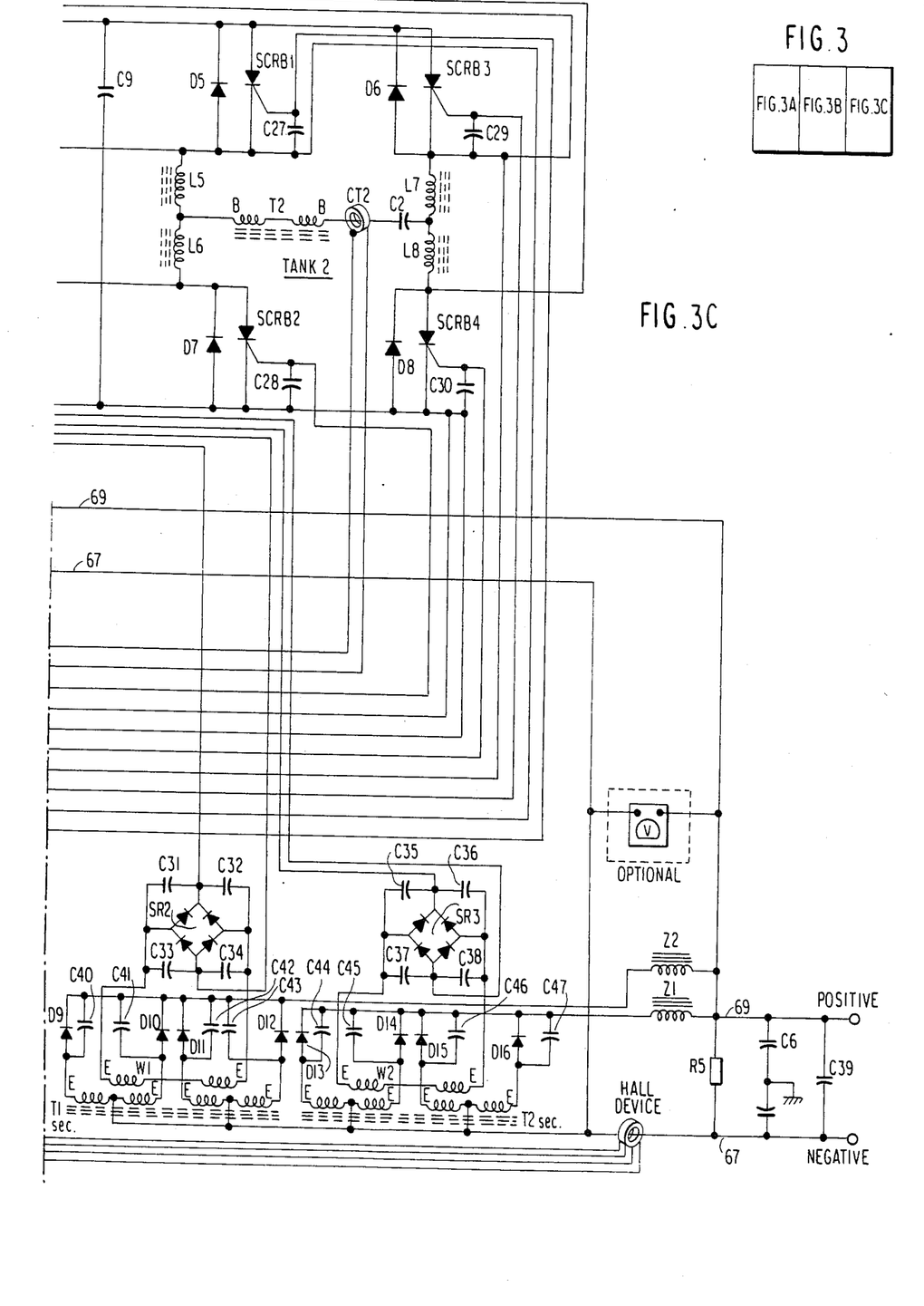
FIG. 3 a schematic diagram illustrating a preferred embodiment of the invention.
Figure 3A:
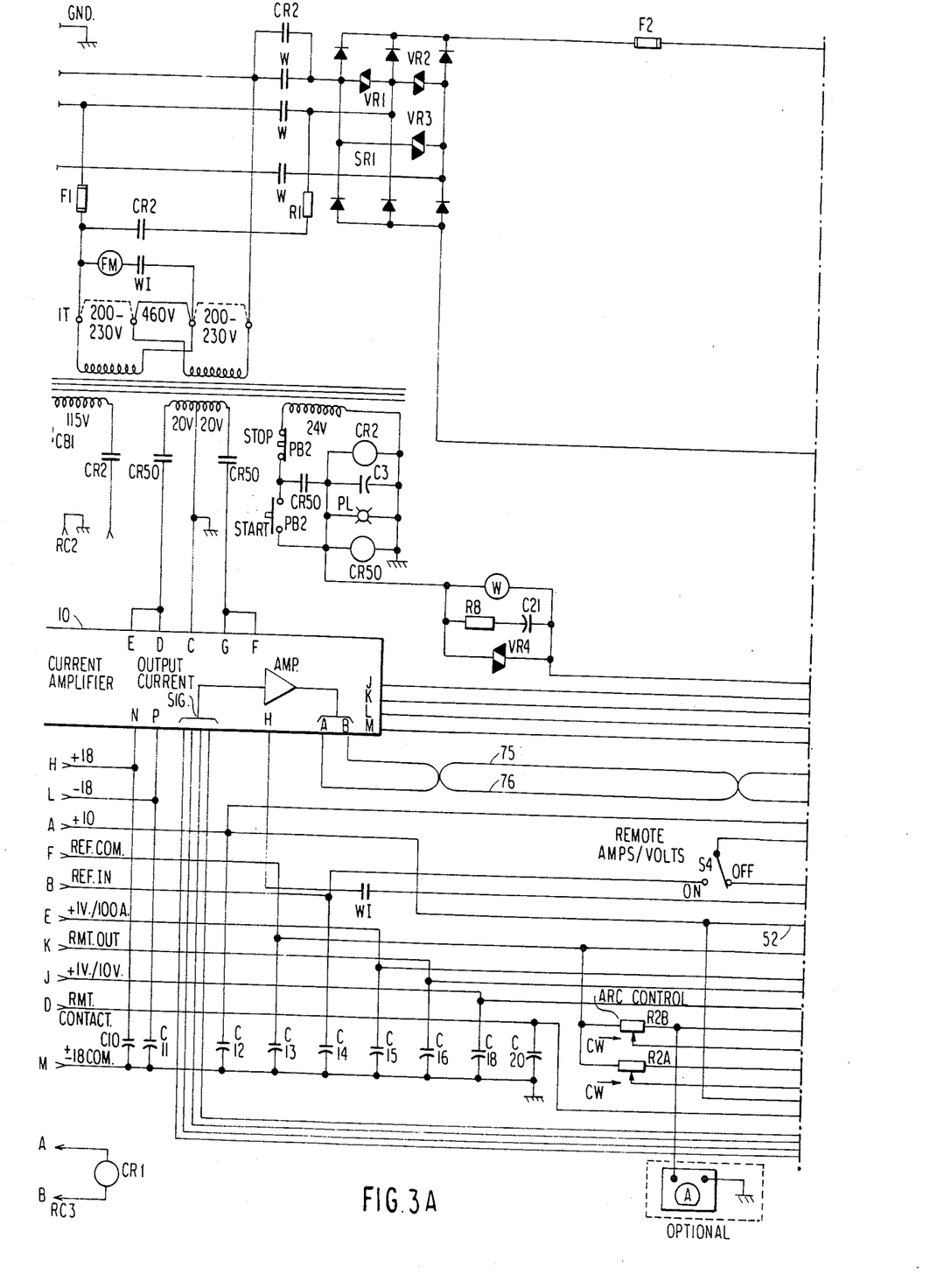
Figure 3B:
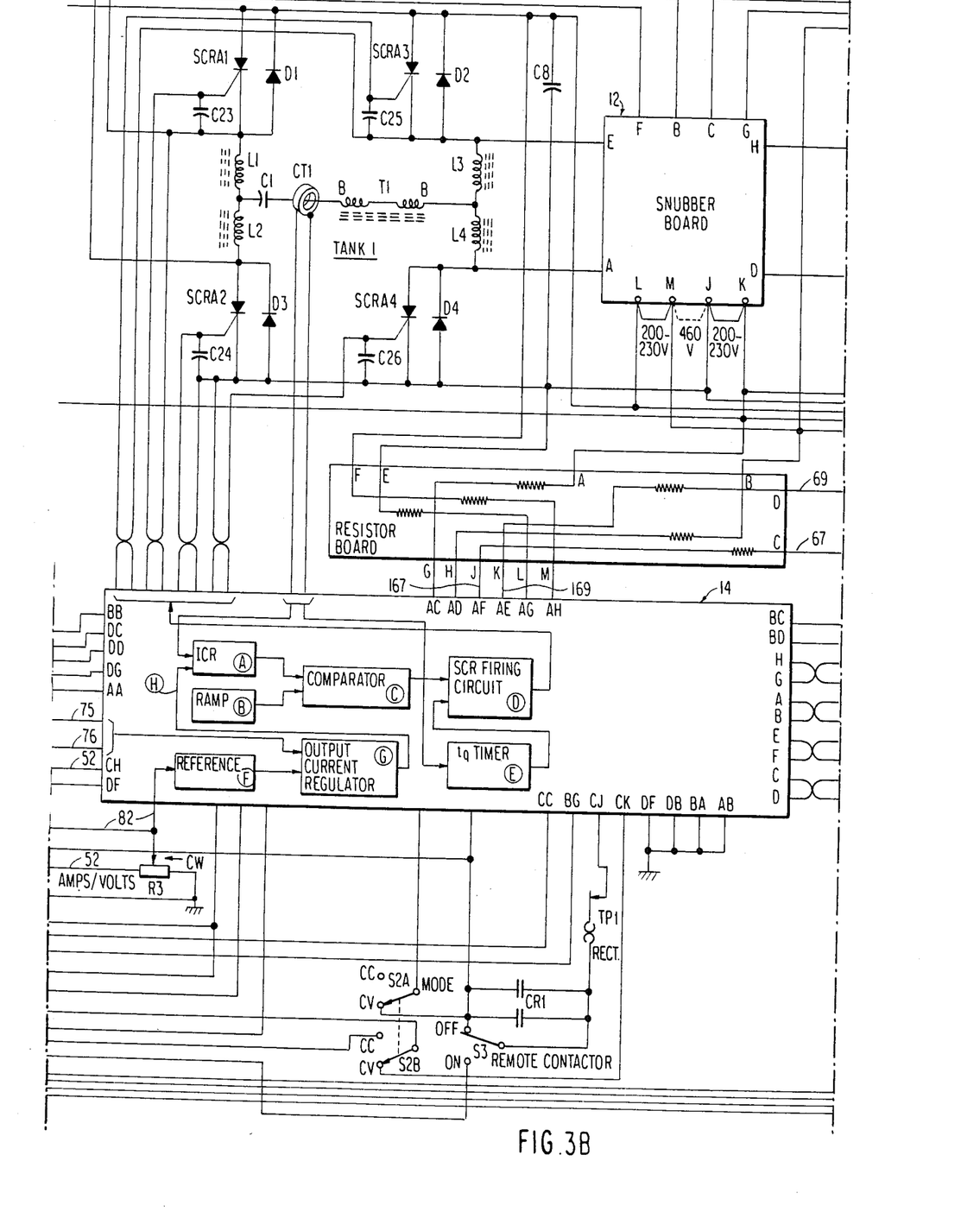
Figure 4:
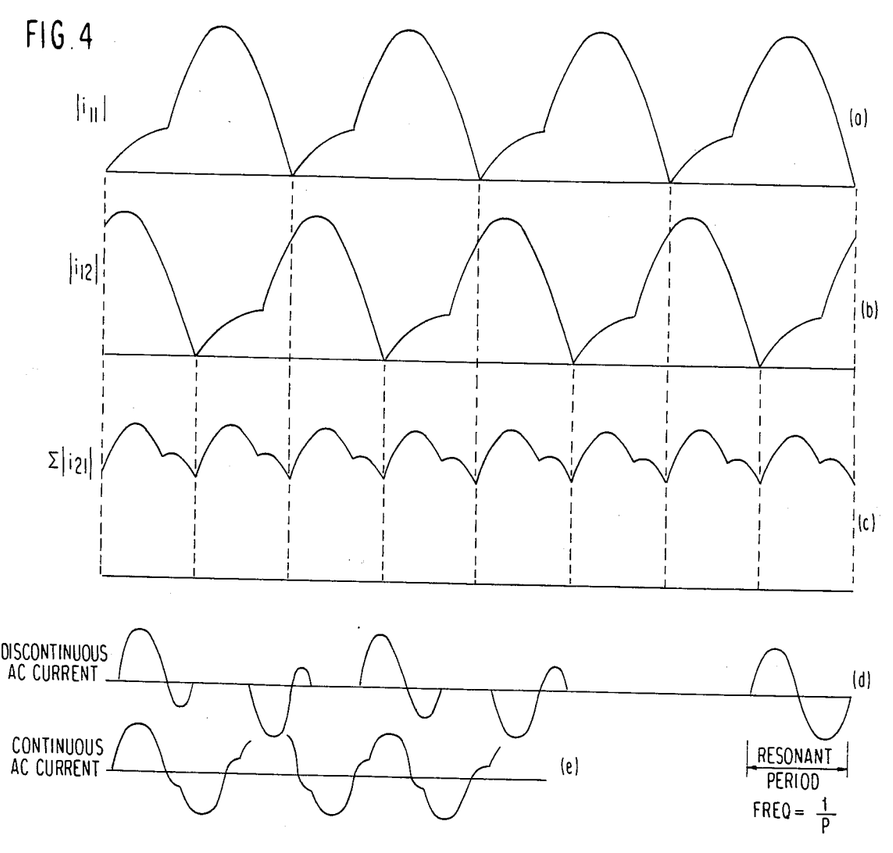
FIGS. 4a through 4e illustrate waveforms which occur in the preferred embodiment.

As shown in FIG. 3, in the present invention we have eliminated the output capacitor (which in the prior art had completed the tank circuit on the output side), thereby improving the response characteristics and saving the cost, size and weight of a premium component which required high ripple current capability.

We have employed a gapped power transformer T1, T2 which permits the elimination of the prior art output capacitor and makes possible the use of a more favorable turns ratio. This results from the fact that an air gap reduces the magnetizing inductance of the transformer. When the converter is operated at light load or at no load, the magnetizing inductance is included in the tank and reduces the resonant frequency. If the magnetizing inductance is large (as with the prior art ungapped core), the reduction in resonant frequency is too great to be tolerated, since the transformer must be designed to operate at the lowest resonant frequency to prevent transformer saturation. This places a size, weight and cost burden on ungapped transformer designs. Thus, we have introduced an air gap in the power transformer to reduce the magnetizing inductance and impose a controlled lower resonant frequency limit on operation at no load, as well as protecting the transformer from saturation.

In order to increase the load ripple current frequency to the highest possible values and reduce the ripple current in the input electrolytic capacitors C8 and C9, we alternately gate Tanks 1 and 2. Each tank is a complete SRC with one-half of the full power capacity of the machine. While this mode of operation is desirable for the reasons previously stated, it has the disadvantage of imposing the same gating frequency on both tanks at all times. Due to component tolerances, each tank may differ slightly in power output. Since both tanks are linked in series for 460 volt input and each tank has an input electrolytic filter, if the line draw is different (for any reason) from Tank 1 to Tank 2, the input electrolytic capacitors' voltage will unbalance. When the unbalance occurs, it cannot be corrected by the control circuit because both tanks are forced to operate at the same frequency.

We have corrected this problem by including on each transformer T1, T2 a spillover winding W1, W2 that is connected to a rectifier SR2, SR3, and by connecting the d.c. output of each rectifier to the electrolytic capacitor of the opposite SRC. Thus, if Tank 1 draws more from the line than Tank 2, the input (bus) voltage to Tank 1 will decrease, and the input (bus) voltage to Tank 2 will increase. As the input voltage to Tank 2 increases, the spillover winding W2 on the transformer T2 of Tank 2 will conduct through rectifier SR3 and reinforce the input voltage to capacitor C8 of Tank 1 to keep the input voltage division balanced, thereby permitting operation on a 460 volt input line with the tanks alternately gated. An additional benefit of the spillover windings is that they provide a passive means to limit the peak tank energy and limit any d.c. offset voltage that may appear on the tank capacitors due to load or regulator transients.

In order to guarantee that the SCR's (SCR1 to 4, etc.) have completely turned off and can again block forward voltage, we use a timer E that begins its timing cycle when the tank current reverses. Current reversal is indicative that the previously conducting SCR's (SCRA1-4) are reverse-biased and their antiparallel diodes D1-D4 are in conduction. We call this function the $t_q$ timer because the turn-off time of an SCR is generally referred to as the $t_q$ time. The $t_q$ timer E is part of the protection system and is used to inhibit the gating pulses until the SCR's are fully turned OFF.

Our $t_q$ timer is unique in that it is adjustable so that it can adapt to the changing resonant tank frequency that occurs from no load to full load (caused by the magnetizing inductance of the gapped power transformer). The adjustment is proportional to load current and is an important feature in stabilizing the tank at light loads. We control the gating frequency to limit the maximum gain of a tank circuit by limiting the maximum gating frequency at any particular load current. Thus, the $t_q$ timer is held long at low output currents (or no output current) corresponding to low resonant frequency, and allowed to shorten at high output currents corresponding to high resonant frequencies.

The magnetizing inductance (established by the air gap) of the transformer T1 is paralleled by the load. Adding load current on the secondary attempts to demagnetize the transformer core, which drives down the magnetizing inductance to the ultimate minimum which is the leakage reactance.

This is how the frequency is affected by the loading of the secondary. With no load, the magnetizing inductance is at its highest and the frequency is lowest because $$f_{res.} = \frac{1}{2\pi \sqrt{LC}}$$

At no load (open circuit voltage on the welding machine), we stretch out the $t_q$ time by reading the output current (it is zero), and we cause the next firing to be delayed for a long time. It prevents the system from "cutting-in" hard, which it would try to do because we have asked for current (ref) but are not getting any. (Outer loop not satisfied).

Thus, the adjustable (or "adaptive") $t_q$ timer protects and stabilizes the tank over changing load (and/or changing resonant frequency) conditions.

When an SRC is operated in the continuous conduction (CCM) mode, that is, when the SCR gate pulses arrive during antiparallel diode conduction, a very nonlinear relationship exists between the gating frequency and the output power. As the gating frequency is brought closer to the resonant frequency of the tank, the output power increases at a considerably faster rate than the rate of increase of the gating frequency. This characteristic makes control of the SRC in this CCM mode difficult to stabilize. To obtain stable operation in this mode, we have introduced a gain reduction in the current regulator loop. We have accomplished this gain reduction by means of a stabilizing "ramp" voltage B which is compared with the output of an integrating current regulator A voltage in the primary regulation (inner) loop. When the ramp voltage equals the voltage output of the integrating current regulator A, a gating pulse is created and steered to the appropriate SCR. The stabilizing ramp is reset at each new gating pulse and appropriately established so that the ramp voltage reaches maximum after one full cycle at the lowest resonant frequency.

The constant of proportionality between the Ref. F and the SCR gating frequency is changed by the influence of the stabilizing ramp B when the SRC enters the continuous conduction mode. The so-called inner loop consists of block A, B, C, D and E, and the outer loop consists of block F and G.

While this method of "frequency-dependent gain reduction" was chosen for the control system, the function of frequency-dependent gain reduction can be accomplished in other ways.

Thus, we provide a frequency-related gain reduction in the inner current regulator loop to stabilize the regulation function when the tank is operated in the continuous conduction mode (CCM).

Figure 5:
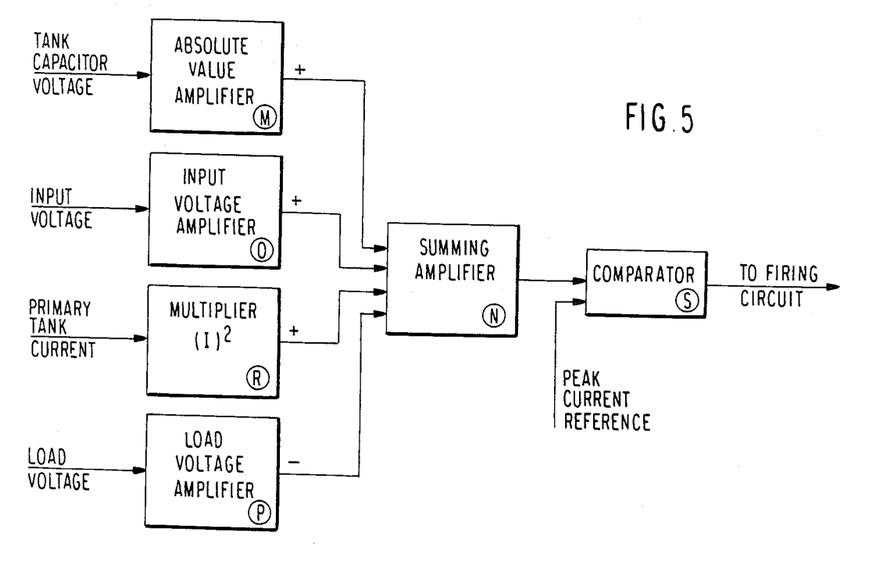
FIG. 5 is a block diagram illustrating a modified version of the preferred embodiment.

In a modified version of the invention, we employ a novel gain reduction circuit that incorporates additional protection of the power circuit. The novel circuit consists of a summing amplifier N that accumulates the absolute value of the tank capacitor voltage M + the input (bus) voltage O + the tank current squared R — the load voltage P (FIG. 5). The resulting signal is compared at S to a current reference to create an inhibit signal similar to the $t_q$ timer output. The resulting signal contains information concerning the maximum current that will result following the next released gate pulse. This circuit provides superior protection and control qualities because it allows the tank to respond to load or reference transients in the shortest possible time while insuring that maximum current and voltage values are not exceeded under any circumstances. Thus, we have provided a regulation or controlling circuit with inherent gain reduction, and including (1) a summing circuit for accumulating the absolute value of the tank capacitor voltage + the input voltage + the tank current squared — the load voltage, and (2) a comparator to create a gating inhibit for the purpose of limiting the maximum current and, therefore, the maximum voltage that can occur in the tank, to produce a regulation and protection function.

It can be seen from the above disclosure where the advantages of the invention lie, but in addition:

The prior art (asdtic controller) integrates primary current and must use gapless transformer cores.

When we gap the transformer and use inductive bypass, we have in the primary a circulating current (which is non load-related), which renders the asdtic regulator unusable.

We have individual inductors at the output which act as output voltage integrators and are not combined until currents go out to the arc. The prior art developed "synchronous noise" because one bridge would contribute a large hit, charge the output capacitor, and then the other bridge would contribute a small hit and the system becomes unstable.

We use one adaptive $t_q$ timer for each bridge. Each is variable, and each timer is slewed by current feedback from the secondary d.c. When output current is low or zero, the time function is increased corresponding with low resonant frequency due to inductive bypass. This limits the cut-in (how close we come to resonance) or the maximum gating frequency so that the repetition rate does not approach the resonant frequency.

The danger of allowing the gating frequency to become too close or equal to the resonant frequency is that the turn-off time is lost, and the tank current and voltage rise to unacceptably high conditions.

In a modified version, we use an integrating current regulator (ICR) and a "predictive peak current" control. The ICR controls in the discontinuous mode and continuous mode (CCM), but in the continuous mode it enjoys a gain break brought about by the predictive circuitry:

The circuit is based on the principle that the peak current equals the source voltage + tank capacitor voltage minus load voltage (if an output capacitor is used) + tank current squared + load current squared and scaled by the transformer turns ratio (if no output capacitor is used) multiplied by the square root of the tank capacitance divided by the tank inductance.

Implementation is by summing the appropriate signals and comparing the result to a reference signal. The resulting comparison can be used to enable the gating circuit.

$$I_{Peak} \text{ (With Output Capacitors)} = E_{Source} + E_{Cap\ (Tank)} + (I_{Tank})^2 - E_{Load} \times \sqrt{\frac{C_{Tank}}{L_{Tank}}}$$

$$I_{Peak} \text{ (With No Output Capacitors)} = E_{Source} + E_{Cap\ (Tank)} + (I_{Tank})^2 + (I_{Load})^2 \times \frac{\text{Sec. Turns}}{\text{Primary Turns}} \times \sqrt{\frac{C_{Tank\ Capacitor}}{L_{Tank\ Inductor}}}$$

The main schematic diagram for the entire dual SRC machine is shown in FIG. 3. Basic power flow is upper left to lower right.

The primary (utility) input lines are L1, L2 and L3, with chassis ground. A control transformer T3 connects to L1 and L2 to provide low voltage power for system control Forty volts center-tapped (20-0-20) supplies the Hall amplifier board 10. Twenty-four volts AC feeds relays CR2, CR50 and electromechanical contactor W. (The 115 VAC is for auxiliary equipment.)

The input voltage (3-phase or 1-phase) is rectified to d.c. by rectifier SR1, creating a d.c. "bus" through a protection fuse F2.

The two inverters (SRC's) are shown as Tank 1 and Tank 2. These can be connected in either parallel (for 230 volts) or series (for 460 volts) at the links on snubber board 12 at L, M, J. K.

The primaries of high frequency inverter transformers T1 and T2 are in Tank 1 and Tank 2, respectively. The secondaries of these two transformers (shown at the lower right) feed the re-rectification diodes D9-D16 which connect the inverted high frequency a.c. back to d.c. for the welding loads.

A choke Z1, Z2 is included in each circuit to smooth the output d.c. current. Capacitors C6 and C7 are only small transient suppression devices connected to frame. C39 is a small capacitor used to trap (or charge to) peak voltage during no load conditions. It is not part of the resonant tank circuits. The gapped transformers T1 and T2 permit the tanks to oscillate even though there is no load at the output.

A voltage signal is developed on C39, fed back to the control board (via wires 67 and 69, then 167 and 169) to regulate the output voltage in the control system.

A 10 volt signal is developed on the control board 14 and sent out wire 52 to reference-adjustment potentiometer R3. It is then picked off the wiper of R3 and sent via wire 82 to reference block F.

The output current regulator G accepts the desired reference (from F) and an "actual" output current signal from the Hall amplifier board 10 via wires 75 and 76. It compares the desired vs. the actual current signals, and develops an error signal in the classic form of a closed loop current regulator.

The output H of the current regulator G becomes a new reference into the ICR A. Primary current feedback is obtained from the current transformers (CTI in this case) and compared with the (H) reference signal.

The ICR integrates the difference between those two signals and provides an output voltage which is an error signal of those two. That signal is then compared with the signal from the stabilizing ramp generator B at compatator C.

The resulting difference signal developed in C creates gating or firing pulses as needed to satisfy the load requirements.

The $t_q$ timer E provides supervisory protection for the SCR's by inhibiting gating pulses which may be called for by comparator C. The $t_q$ timer E prevents gating pulses from arriving more frequently than the SCR turn-off times can accommodate.

The right hand side of control board repeats only the SCR firing circuit D; the other blocks A, B, C, E, F and G are common to both SRC's.

What is claimed is:
1. A welding power supply comprising:
   series resonant converter means for converting D.C. input power to A.C. power and having a series-resonant tank circuit including a capacitor, an inductor and the primary winding of a transformer having an air-gapped core;
   controllable switching means for controlling the flow of current in said tank circuit to produce a ringing current therein;
   said transformer having a secondary winding for supplying load current to a load;
   first current sensing means for sensing the ringing current and providing a first feedback signal indicative thereof;
   second current sensing means for sensing the load current and providing a second feedback signal indicative thereof; and
   control means, responsive to both feedback signals, for controlling the switching frequency of said switching means so that said load current is maintained at a desired value.
2. A welding power supply as defined in claim 1, wherein said series resonant converter means comprises two series resonant converters, and means for selectively connecting said converters in series and in parallel.

3. A welding power supply as defined in claim 1, wherein the resonant frequency of said tank circuit varies from approximately 18 kHz, at no load, to approximately 38 kHz at full load, wherein said control means controls said switching frequency always to be less than the resonant frequency.

4. A welding power supply as defined in claim 1, wherein said first current sensing means comprises a current transformer coupled to said tank curcuit, and said second current sensing means comprises a Hall-effect device coupled to said load.

5. A welding power supply as defined in claim 4, wherein said controllable switching means comprises a bridge containing four SCRs connected in said tank circuit and each having a gate electrode, said control means supplying firing pulses to the gate electrodes at a frequency necessary to maintain said desired value of load current.

6. A welding power supply as defined in claim 5, further comprising $t_q$ timer means for inhibiting the firing pulses from being supplied more frequently than a predetermined turn-off time of said SCRs.

7. A welding power supply as defined in claim 5, wherein said control means comprises inner and outer current regulating loops, including a ramp generator, for modifying said switching frequency when said series resonant converter means is in the continuous conduction mode.

8. A welding power supply as defined in claim 7, further comprising predictive circuit means for producing an enable/inhibit signal to limit said switching frequency in the continuous conduction mode, said predictive circuit means comprising summing circuit means to produce a sum signal proportional to the tank capacitor voltage plus the input voltage plus the tank current squared minus the load voltage, and means for comparing the sum signal with a reference signal, indicative of the peak current allowed in the tank circuit, to produce said enable/inhibit signal.

9. A welding power supply as defined in claim 1, wherein all of the capacitance for said series resonant circuit is located entirely on the primary side of said transformer.

* * * * *